US006371441B1

(12) United States Patent
Mattes

(10) Patent No.: US 6,371,441 B1
(45) Date of Patent: Apr. 16, 2002

(54) FUEL INJECTION VALVE

(75) Inventor: Patrick Mattes, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/673,720

(22) PCT Filed: Dec. 30, 1999

(86) PCT No.: PCT/DE99/04128

§ 371 Date: Dec. 7, 2000

§ 102(e) Date: Dec. 7, 2000

(87) PCT Pub. No.: WO00/49288

PCT Pub. Date: Aug. 24, 2000

(30) Foreign Application Priority Data

Feb. 20, 1999 (DE) ........................................ 199 07 348

(51) Int. Cl.[7] ........................ F16K 31/02; F16K 15/00; F02M 59/20; F02M 61/20

(52) U.S. Cl. ........................... 251/129.08; 251/129.15; 251/337; 251/322; 123/446; 239/533.5; 239/533.9; 239/533.15

(58) Field of Search ...................... 251/129.08, 129.04, 251/322, 129.07, 337, 129.15; 123/446; 239/533.5, 533.9, 533.12

(56) References Cited

U.S. PATENT DOCUMENTS 4,436,247 A * 3/1984 Akagi ........................ 239/533
4,588,132 A * 5/1986 Neitz et al. ................. 239/453
4,669,668 A * 6/1987 Oqawa ..................... 239/533.5
4,768,719 A * 9/1988 Straubel et al. .......... 239/533.4
4,840,310 A * 6/1989 Haider ....................... 239/533
5,127,583 A * 7/1992 Taue ........................... 239/96

* cited by examiner

*Primary Examiner*—Philippe Derakshani
*Assistant Examiner*—David A Borderer
(74) *Attorney, Agent, or Firm*—Ronald E. Greigg

(57) ABSTRACT

A fuel injection valve, including a valve member which can control the opening and closing of a fuel outlet opening, an actuating mechanism which can move the valve member, and a compensation device which can exert compensation forces on the valve member that counteract an opening stroke of the valve member, wherein the compensation device has a piston which is supported so that it can move in an associated cylinder, wherein at one end, the piston defines a hydraulic chamber in the cylinder, which is acted on with a reference pressure, and in a starting position, the piston is supported at the other end against a stop that is stationary in relation to the cylinder, and via a force transmission mechanism, the valve member can drive the piston out of its starting position away from the stop. In this manner valve operation should be improved with regard to its controllability. This is achieved by virtue of the fact that the force transmission mechanism is embodied as springs that are stressed by the valve member during the opening stroke of the valve member.

20 Claims, 3 Drawing Sheets

FUEL INJECTION VALVE

CROSS-REFERENCE TO RELATED APPLICATION

This is a 35 USC 371 application of PCT/DE 99/104128 filed on Dec. 30, 1999.

PRIOR ART

BACKGROUND OF THE INVENTION

A fuel injection valve of this kind has been disclosed by DE 197 27 896.5, filed Jul. 1, 1997, which and contains a valve member, which is supported so that it can move bidirectionally and can control the opening and closing of a fuel outlet opening. Actuating means are provided, which can move the valve member in order to open and close the fuel outlet opening. In this instance, the actuating means include an electrically actuatable control valve and a discharge pressure chamber, which on the one hand —via a connection that can be opened and closed by the control valve—communicates with a closing pressure chamber and on the other hand communicates with a relatively pressure-free fuel tank. The closing pressure chamber is defined on one end by a closing pressure surface embodied on the valve member and communicates with a high-pressure fuel source, via a throttle, wherein the pressure in the closing pressure chamber against the closing pressure surface generates a closing force, which engages the valve member. When the control valve is closed, the pressure in the closing pressure chamber produces a closing force of sufficient magnitude to hold the valve member in its closed position. When the control valve is opened, a pressure drop occurs in the closing pressure chamber since more fuel can escape into the discharge pressure chamber through the open connection that can flow into the closing pressure chamber via the throttle. This results in the fact that the closing force generated by the pressure in the closing pressure chamber is reduced until the opening forces engaging the valve member predominate and the valve member executes an opening stroke.

When the valve member is disposed in its closed position, a sealing zone of the valve member cooperates with a valve seat in such a way that a surface area section of the valve member in the sealing zone or downstream of the sealing zone is decoupled from the high pressure prevailing upstream of the sealing zone. As soon as an opening stroke of the valve member lifts the sealing zone up from the valve seat, the high pressure can also build up downstream of the sealing zone since less fuel can escape through the fuel outlet opening than flows into the high-pressure fuel source through the connection that is now open. This results in the fact that during the opening stroke of the valve member, the high pressure also prevails against the above-mentioned surface area section downstream of the sealing zone and introduces an additional opening force onto the valve member. In order to reduce the influence of these additional dynamic opening forces on the adjusting movement of the valve member and consequently on the control behavior of the fuel injection valve, the known fuel injection valve has compensation means which can exert compensation forces on the valve member which counteract an opening stroke of the valve member. In the known fuel injection valve, these compensation means have a piston, which is supported so that it can move in an associated cylinder. At one end, the piston defines a hydraulic chamber in the cylinder, which is acted on with a reference pressure, in particular the pressure of the high-pressure fuel source. At the other end, the piston is supported in a starting position against a stop that is stationary in relation to the cylinder; via force transmission means, the valve member can drive the piston out of its starting position, which moves it away from its stop. In the known fuel injection valve, the force transmission means are constituted by an additional hydraulic chamber which is defined on one end by the piston and is defined on the other end by a compensation pressure surface embodied on the valve member. With an opening stroke of the valve member, therefore, a pressure can build up in this additional hydraulic chamber of the force transmission means, which rapidly increases to a maximum value, but then remains constant because the position of the piston can change starting at this maximum pressure value, so that the volume in the additional hydraulic chamber remains constant. As a result, a stabilizing compensation force on the valve member is produced, which evens out the opening process of the fuel injection valve member and improves the controllability of the fuel injection valve. The functioning of this compensation means, particularly during the closing of the valve member, thus depends on the leakage occurring and the rigidity of the hydraulic medium, in particular fuel, being used for the transmission of force, which can have a particularly powerful effect at high injection pressures.

OBJECT OF THE INVENTION

It is a principal object of the invention, to provide a fuel injection valve in which the compensation forces, particularly their dependence on the opening stroke of the valve member, can be more precisely predetermined since the elasticities or rigidities of the springs used can be predetermined with a high degree of precision. In addition, an increased functional reliability can be assured for the closing process of the valve member since spring means operate independently of leakages.

BRIEF DESCRIPTION OF THE DRAWINGS

Exemplary embodiments of the fuel injection valve according to the invention are depicted in the drawings and will be explained in more detail below.

DESCRIPTION OF THE EXEMPLARY EMBODIMENTS

Figure 1:
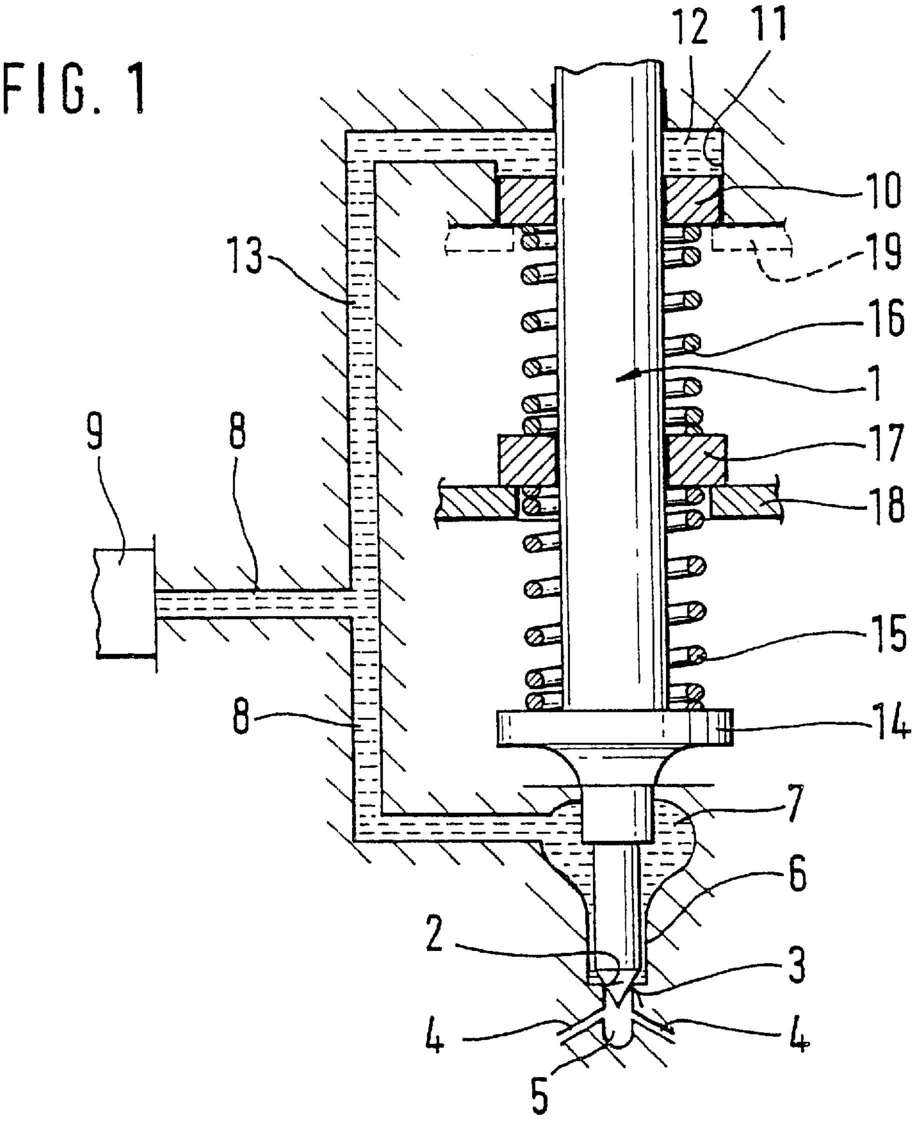
FIG. 1 is a schematic longitudinal section through a region of a fuel injection valve according to the invention, in the vicinity of a compensation means, according to a first embodiment.

According to FIG. 1, a needle-like valve member 1 is supported and guided on the inside of a fuel injection valve in order to execute bidirectional adjusting motions or stroke movements. The valve member 1 has a sealing zone 2 which cooperates with a valve seat 3. The valve member 1 can control the opening and closing of fuel outlet openings 4, which feed into a combustion chamber of an internal combustion engine, in particular a diesel engine. The sealing zone 2 and valve seat 3 open or close a connection between a blind chamber 5, which contains the fuel outlet openings 4 and is disposed downstream of the sealing zone 2, and a pressure chamber 7, which is disposed upstream of the sealing zone 2 and is connected to this blind chamber by means of an annular chamber 6. This pressure chamber 7 communicates with a high-pressure fuel source 9 via a high-pressure line 8.

When the valve member 1 is disposed in its closed position, the blind chamber 5 is without pressure so that a lower pressure prevails downstream of the sealing zone 2 while the high fuel pressure prevails upstream of the sealing zone 2. As soon as the valve member 1 is triggered by actuating means, not shown, to execute an opening stroke and consequently, as soon as the pressure chamber 7 communicates with the blind chamber 5, the high fuel pressure essentially also prevails downstream of the sealing zone 2 so that an additional opening force builds up there, which engages the valve member 1. In order to compensate as much as possible for this additional opening force, compensation means are provided which can act on the valve member 1 with compensation forces that counteract these additional opening forces.

The above-mentioned compensation means in this instance has a piston 10, which is supported so that it can move in a cylinder 11. The piston 10 and the cylinder 11 are concentrically penetrated by the valve member 1 or are disposed axially around it, wherein the piston 10 is embodied as an annular piston. In the cylinder 11, the piston 10 defines a hydraulic compensation pressure chamber 12, which is connected to the high-pressure fuel source 9 via a corresponding high-pressure line 13 so that the high fuel pressure constitutes the reference pressure prevailing in the chamber 12. In particular, the connection of the hydraulic chamber 12 to the high-pressure fuel source 9 is not throttled. Preferably, the pressure chamber 7 and chamber 12 can communicate directly with each other via the high-pressure lines 8 and 13.

Coaxial to the valve member 1, spring means are disposed axially between the piston 10 and an annular shoulder 14 embodied on the valve member 1, namely a first helical compression spring 15 and a second helical compression spring 16, which are supported on one end against the piston 10 and on the other end against the annular shoulder 14. An annular support element 17 is disposed axially between the springs 15 and 16, wherein the first spring 15 is supported on one end against the annular shoulder 14 and on the other end against the support element 17 and the second spring 16 is supported on one end against the piston 10 and on the other end against the support element 17.

The compensation force, which is exerted on the piston 10 by the pressure in the compensation pressure chamber 12, is transmitted to the support element 17 by the second spring 16. The axial mobility of the support element 17 coaxially along the valve member 1 is limited by a stop 18 that is stationary in relation to the cylinder 11 so that the second spring 16 is prestressed by the pressure prevailing in the compensation pressure chamber 12.

Figure 2:
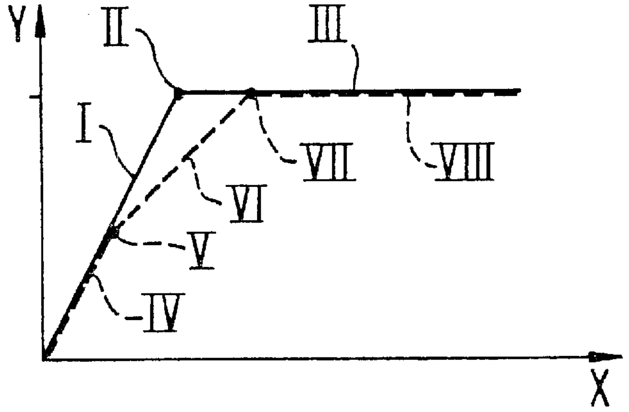
FIG. 2 is a schematic diagram which depicts a correlation between needle stroke and compensation force that can be achieved with the embodiment according to FIG. 1.

In FIG. 2, the stroke of the valve member 1 is plotted in the X-direction and the dependency of the stroke on the compensation force exerted on the valve member 1 is plotted in the Y-direction. Therefore, in the embodiment according to FIG. 1, at the beginning of the opening stroke of the valve member 1, at first, only the spring force of the first spring 15 acts as a compensation force Y which increases linearly with the valve stroke X. This range is labeled I in FIG. 2. As soon as the first spring 15 is prestressed at the prestressing force of the second spring 16 (II), the support element 17 lifts up from the stop 18 and—since the initial stress of the second spring 16 correlates to the pressure in the compensation pressure chamber 12—the piston 10 is moved into the compensation pressure chamber 12. Since the fuel can escape from the compensation pressure chamber 12 via the high-pressure line 13, the pressure in the compensation pressure chamber 12 and consequently, the resulting restoring force of the first spring 15 and the second spring 16, remains constant so that in a stroke range that is labeled with III in FIG. 2, the compensation force remains essentially constant.

In one variant, the annular piston 10, the support element 17, and the second spring 16 disposed between them can be replaced by a sleeve-like piston that is supported directly against the stop 18. Likewise, in another variant, the support element 17 and the second spring 16 can be eliminated, wherein the first spring 15 then rests directly against the piston 10 and a stop 19 is provided for the piston 10, which is depicted with dashed lines in FIG. 1 and cooperates directly with the piston.

In another variant of the embodiment shown in FIG. 1, in addition to the stop 18 that the support element 17 rests against, the stop 19 is provided, which the piston 10 rests against. The distance between the stops 18 and 19 is matched to the second spring 16 so that a prestressing force in the closing direction of the valve member 1 is produced in the second spring 16 that is weaker than the force exerted on the piston 10 by the pressure in the compensation pressure chamber 12. An embodiment of this kind then produces the correlation that is shown with dashed lines in FIG. 2. In a first stroke range IV, only the restoring force of the first spring 15 once again acts as a compensation force. At V, the restoring force of the first spring 15 reaches the prestressing force of the second spring 16 so that in a second stroke range VI, both springs 15, 16 contribute to the compensation force. At VII, the resulting total restoring force of the springs 15 and 16 reaches the force exerted on the piston 10 in the pressure chamber 12 so that in a third stroke range VIII, the compensation force remains essentially constant due to the mobility of the piston 10.

Figure 3:
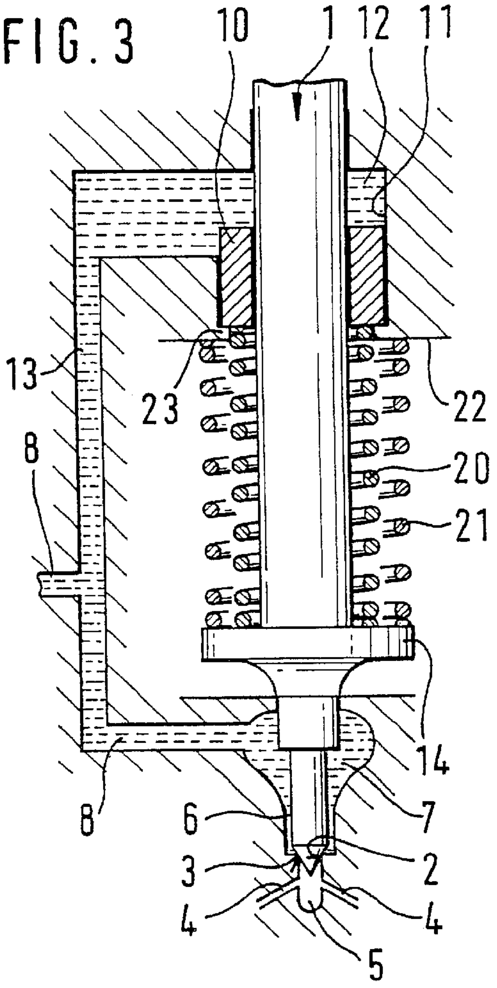
FIG. 3 is a schematic longitudinal section as shown in FIG. 1, but of a second embodiment of the fuel injection valve according to the invention.

According to FIG. 3, the spring means with which the compensation forces are transmitted to the valve member 1 are constituted by a first helical compression spring 20, which is supported on one end against the piston 10 and is supported on the other end against the annular shoulder 14, and by a second spring 21, which is supported on one end against the annular shoulder 14 and on the other end against a buttress 22 that is stationary in relation to the cylinder 11. The end of the piston 10 remote from the compensation pressure chamber 12 is associated with a stop 23 against which the piston 10 is prestressed by the pressure prevailing in the compensation pressure chamber 12.

Figure 5:
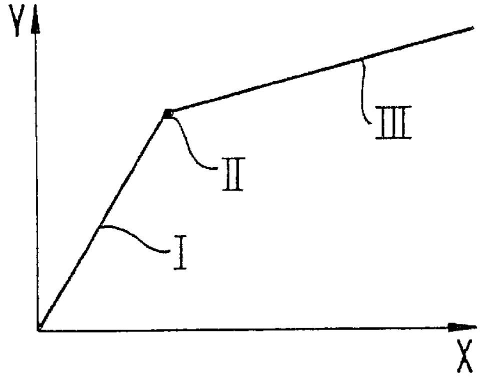
FIG. 5 is a diagram as shown in FIG. 2, which depicts the correlation between needle stroke and compensation force that can be achieved with the embodiments according to FIGS. 3 and 4.

The embodiment shown in FIG. 3 produces the correlation depicted in FIG. 5 between the opening stroke X of the valve member 1 and the compensation force Y. In a first stroke region I, both springs 20 and 21 are stressed by the opening stroke of the valve member 1, without the piston 10 moving. At II, the restoring force of the first spring 20 reaches the force exerted on the piston 10 by the pressure in the compensation pressure chamber 12. In the subsequent stroke range III, a further stressing of the first spring 20 by the adjusting motion of the piston 10 is prevented while the second spring 21 can be prestressed further. Consequently, a different proportionality between the opening stroke X and the compensation force Y is produced in the second stroke range III.

Figure 4:
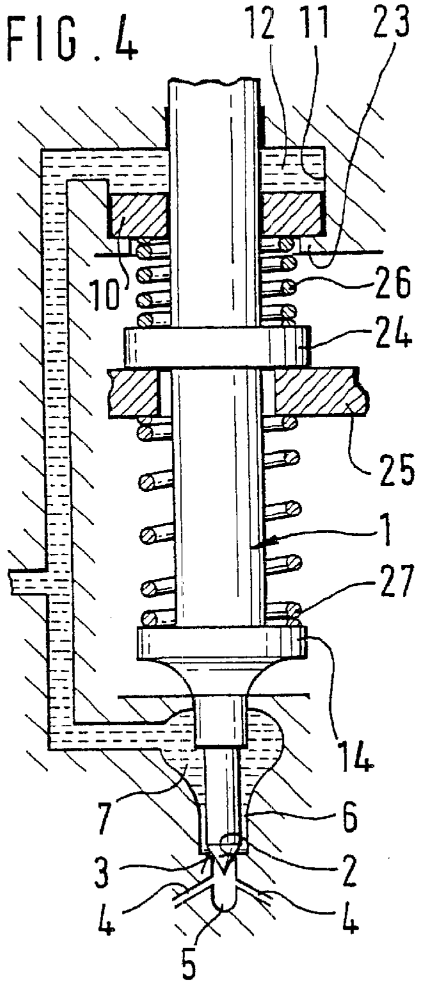
FIG. 4 is a schematic longitudinal section as shown in FIG. 1, but of a third embodiment of the fuel injection valve according to the invention.

According to one variant according to FIG. 4, an annular collar 24 is embodied on the valve member 1 and is associated with a stop 25, which is stationary with regard to the cylinder 11 and against which the annular collar 24 comes to rest when the valve member 1 is disposed in its closed position. The piston 10 in this instance—as in the embodiment according to FIG. 3—is prestressed against the stop 23 by the pressure in the compensation pressure chamber 12. A first spring 26 is supported on one end against the piston 10 and on the other end against the annular collar 24 and a second spring 27 is supported on one end against the annular shoulder 14 and on the other end against the stop 25, on an end remote from the annular collar 24. This embodiment according to FIG. 4 permits the same correlation to be produced between the opening stroke X of the valve member 1 and the compensation force Y as FIG. 5 has already depicted for the embodiments according to FIG. 3. In the first stroke range I, both springs 26 and 27 are stressed. At II, the prestressing force of the first spring 26 reaches the force with which the piston 10 is prestressed against the stop 23 by the pressure in the compensation pressure chamber 12, and in the second stroke range III, only the second spring 27 is additionally stressed, while the first spring 26 has a prestressing force that remains constant due to the mobility of the piston 10.

Figure 6:
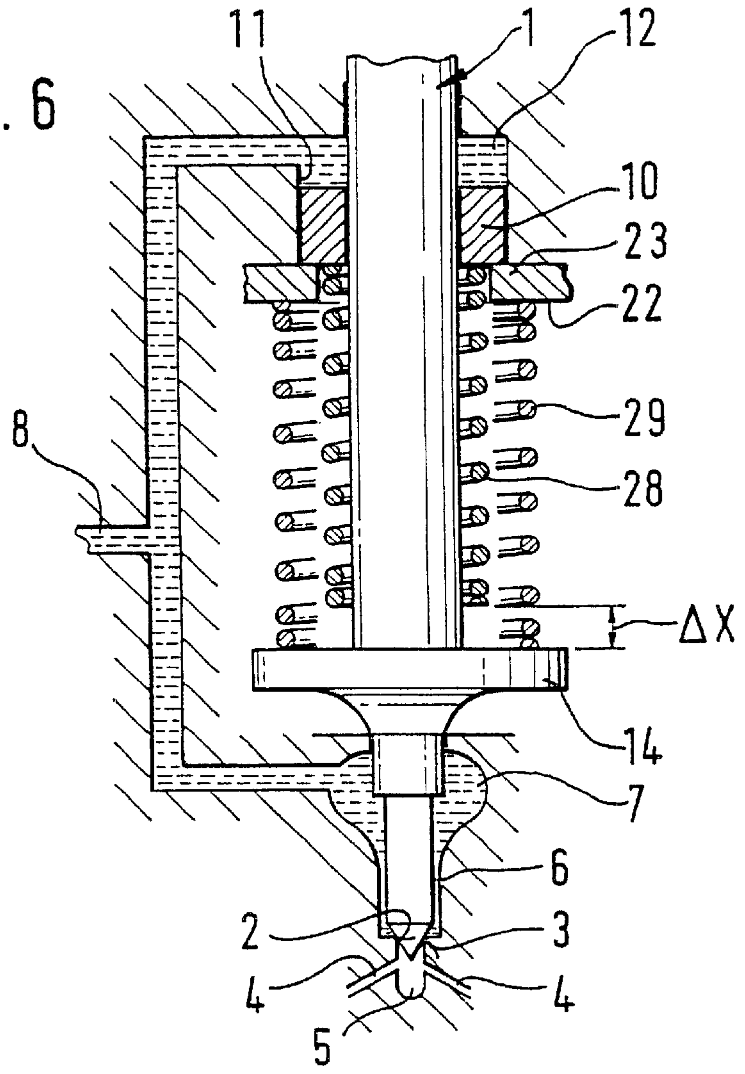
FIG. 6 is a schematic longitudinal section as shown in FIG. 1, but of a fourth embodiment of the fuel injection valve according to the invention.

According to FIG. 6, in another embodiment, a first helical compression spring 28 is disposed axially between the piston 10 and the annular shoulder 14, coaxial to the valve member 1. This first spring 28 is dimensioned so that when the valve member 1 is disposed in its closed position and the piston 10 is resting against the stop 23, the first spring has a clearance ÄX so that with an opening stroke X up to the value ÄX, the first spring 28 cannot be simultaneously supported against the piston 10 and the annular shoulder 14.

A second spring 29 is disposed coaxial to the first spring 28 and coaxial to the valve member 1 and is supported on one end against the annular shoulder 14 and is supported on the other end against the buttress 22 that is embodied on the stop 23 in this instance.

Figure 7:
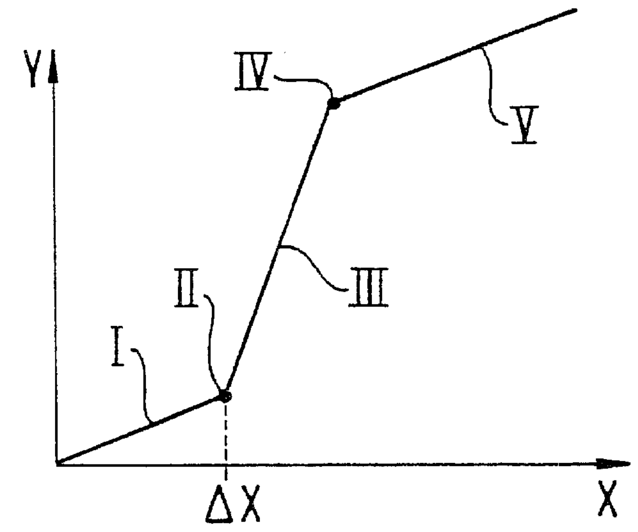
FIG. 7 is a diagram like the one shown in FIG. 2, but one which depicts the correlation between needle stroke and compensation force that can be achieved with the embodiment according to FIG. 6.

The embodiment depicted in FIG. 6 produces the correlation shown in FIG. 7 between the opening stroke X of the valve member 1 and the compensation force Y. In a first stroke range I, due to the clearance ÄX, only the second spring 29 is stressed. At II, the opening stroke reaches the value of the clearance ÄX so that in a subsequent second stroke range III, in addition to the second spring 29, the first spring 28 is also stressed. At IV, the prestressing force of the first spring 28 reaches the force with which the piston 10 is prestressed against the stop 23 by the pressure in the compensation pressure chamber 12 so that in a subsequent third stroke region V, only the initial stress of the second spring 29 increases, while the initial stress of the first spring 28 remains essentially constant due to the movement of the piston 10.

The foregoing relates to a preferred exemplary embodiments of the invention, it being understood that other variants and embodiments thereof are possible within the spirit and scope of the invention, the latter being defined by the appended claims.

I claim:

1. A fuel injection valve having a valve member that can be moved by an actuator, the valve comprising:

said valve member (1) being supported so that it can move bidirectionally and thus control the opening and closing of a fuel outlet opening (4), the fuel injection valve having compensation means which exert compensation forces (Y) on the valve member (1) that counteract an opening stroke of the valve member (1), the compensation means having a piston (10) and an associated cylinder (11), the piston being mounted so that it can move in the associated cylinder (11), the cylinder (11) defining a hydraulic chamber (12), which is acted on with a reference pressure in its starting position, the piston (10) being supported against a stop (18; 19; 23) that is stationary in relation to the cylinder (11), force transmission means (15, 16; 20, 21; 26, 27; 28, 29) acting between the valve member and the piston such that the valve member (1) can drive the piston (10) out of its starting position away from the stop (18; 19; 23), wherein the force transmission means are spring means (15, 16; 20, 21; 26, 27; 28, 29) that are stressed by the valve member (1) during the opening stroke of the valve member (1).

2. The fuel injection valve according to claim 1, in which the piston is an annular piston (10) that coaxially encompasses the valve member (1).

3. The fuel injection valve according to claim 2, in which the spring means have a first spring element (15) and a second spring element (16), and the piston (10) is supported with a support element (17) against the stop (18), wherein the first spring element (15) is supported against the valve member (1) and against the support element (17), and the second spring element (16) is supported against the piston (10) and against the support element (17).

4. The fuel injection valve according to claim 2, in which the spring means have a first spring element (20; 26) which is supported against the piston (10) and against the valve member (1), and a second spring element (21; 27) is provided, which is supported against the valve member (1) and against a stop element (22; 25) which is stationary in relation to the cylinder (11).

5. The fuel injection valve according to claim 4, in which the spring elements (20, 21) are disposed on the valve member (1) so that they are coaxial to each other and coaxial to the valve member (1).

6. The fuel injection valve according to claim 4, in which the spring elements (26, 27) are disposed on the valve member (1) so that they are in axial series with each other and are coaxial to the valve member (1).

7. The fuel injection valve according to claim 2, in which the support element (17) is embodied as an annular element coaxially encompassing the valve member (1).

8. The fuel injection valve according to claim 2, in which the first spring element (28) has a clearance from the valve member such that in a first stroke range (I) beginning in a closed position of the valve member (1), the first spring element (28) does not transmit any forces between the piston (10) and the valve member (1), and only in a second stroke range (III) following the first stroke range (I), does this first spring element (28) transmit force between the piston (10) and the valve member (1).

9. The fuel injection valve according to claim 2, in which the spring elements (15, 16; 20, 21; 26, 27; 28, 29) are disposed coaxial to the valve member (1).

10. The fuel injection valve according to claim 1, in which the spring means have a first spring element (15) and a second spring element (16), and the piston (10) is supported with a support element (17) against the stop (18), wherein the first spring element (15) is supported against the valve member (1) and against the support element (17), and the second spring element (16) is supported against the piston (10) and against the support element (17).

11. The fuel injection valve according to claim 10, in which the spring elements (15, 16; 20, 21; 26, 27; 28, 29) are disposed coaxial to the valve member (1).

12. The fuel injection valve according to claim 10, in which the support element (17) is embodied as an annular element coaxially encompassing the valve member (1).

13. The fuel injection valve according to claim 1, in which the spring means have a first spring element (20; 26) which is supported against the piston (10) and against the valve member (1), and a second spring element (21; 27) is provided, which is supported against the valve member (1) and against a stop element (22; 25) which is stationary in relation to the cylinder (11).

14. The fuel injection valve according to claim 13, in which the spring elements (20, 21) are disposed on the valve member (1) so that they are coaxial to each other and coaxial to the valve member (1).

15. The fuel injection valve according to claim 14, in which the first spring element (28) has a clearance from the valve member such that in a first stroke range (I) beginning in a closed position of the valve member (1), the first spring element (28) does not transmit any forces between the piston (10) and the valve member (1), and only in a second stroke range (III) following the first stroke range (I), does this first spring element (28) transmit force between the piston (10) and the valve member (1).

16. The fuel injection valve according to claim 13, in which the spring elements (26, 27) are disposed on the valve member (1) so that they are in axial series with each other and are coaxial to the valve member (1).

17. The fuel injection valve according to claim 13, in which the support element (17) is embodied as an annular element coaxially encompassing the valve member (1).

18. The fuel injection valve according to claim 1, in which the first spring element (28) has a clearance from the valve member such that in a first stroke range (I) beginning in a closed position of the valve member (1), the first spring element (28) does not transmit any forces between the piston (10) and the valve member (1), and only in a second stroke range (III) following the first stroke range (I), does this first spring element (28) transmit force between the piston (10) and the valve member (1).

19. The fuel injection valve according to claim 1, in which the spring elements (15, 16; 20, 21; 26, 27; 28, 29) are disposed coaxial to the valve member (1).

20. The fuel injection valve according to claim 1, in which the support element (17) is embodied as an annular element coaxially encompassing the valve member (1).

* * * * *